H. W. ELLIOTT.
FINELY GRADUATED POSITIVE LOCK FOR NUTS.
APPLICATION FILED JUNE 11, 1919.
1,369,332. Patented Feb. 22, 1921.
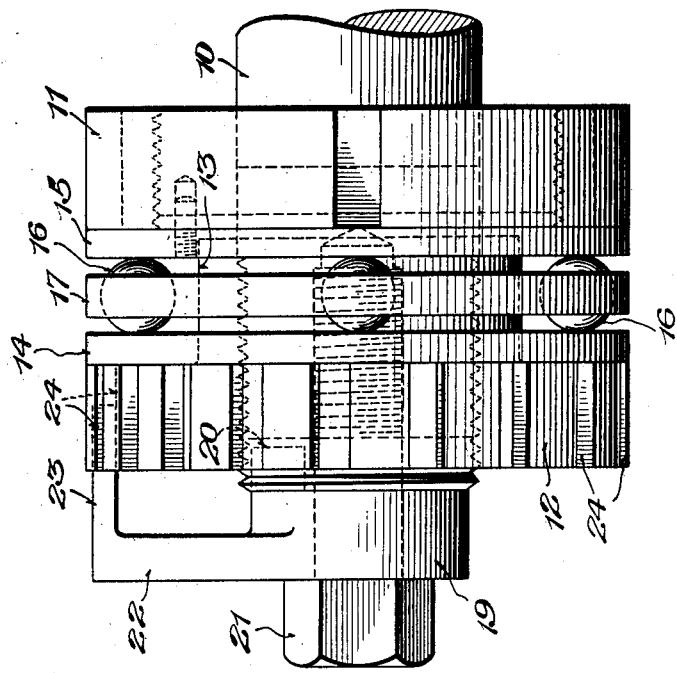
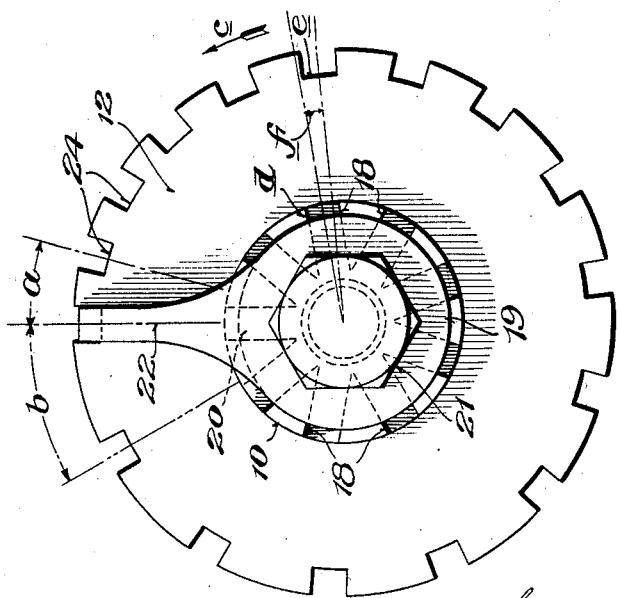
Witness
Chas. L. Griesbauer
Inventor
Harold W. Elliott
By Foster, Freeman, Watson & Coit,
Attorneys

UNITED STATES PATENT OFFICE.

HAROLD W. ELLIOTT, OF DETROIT, MICHIGAN, ASSIGNOR TO PACKARD MOTOR CAR COMPANY, OF DETROIT, MICHIGAN, A CORPORATION OF MICHIGAN.

FINELY-GRADUATED POSITIVE LOCK FOR NUTS.

1,369,332.

Specification of Letters Patent.   Patented Feb. 22, 1921.

Application filed June 11, 1919. Serial No. 303,441.

*To all whom it may concern:*

Be it known that I, HAROLD W. ELLIOTT, a citizen of the United States, and residing at Detroit, Wayne county, State of Michigan, have invented certain new and useful Improvements in Finely-Graduated Positive Locks for Nuts, of which the following is a specification.

The present invention relates to devices for locking one member against rotation relative to another in any one of a plurality of finely graduated positions.

The objects and features of novelty will be apparent from the description taken in connection with the drawings in which:

Figure 1 is an end elevation of a device constructed in accordance with the present invention; and Fig. 2 is a side elevation of the same.

The present invention is illustrated in connection with a roller thrust bearing; but it is to be understood that it is not limited to this particular use but has a wide field of utility.

Referring to the drawings the numeral 10 indicates a shaft having a threaded end and a collar or sleeve 11 disposed adjacent the end of said threaded portion. Screwed on the end of the shaft is a nut 12 preferably provided with the boss 13 extending toward the collar 11. A roller thrust bearing of any desired type is interposed between the nut 12 and collar 11 and as shown comprises race rings 14 and 15, the rollers 16 and the spacing ring 17. Preferably the boss 13 acts to center the race rings 14 and 15. In roller bearings it is desirable to provide for a very fine adjustment of the race rings or cones in order to take up for wear and yet not have the parts in too close contact. It is further necessary to provide some means for locking the parts in adjusted position and this means should be strong and at the same time should permit the locking of the parts in any one of a plurality of finely graduated rotative positions. Thus in the present embodiment of the invention means is provided for locking the nut 12 to the shaft 10 in any one of a plurality of finely graduated positions.

As shown the locking means comprises an element operatively associated with the shaft and the nut. Thus the end of the shaft 10 is provided with a plurality of equally spaced radial recesses 18. A hub or collar 19 is clamped against the end of the shaft with a lug 20 thereof adapted to be disposed in one of the recesses 18 by means of the bolt 21 threaded into an axially disposed bolt hole in the end of the shaft. The hub 19 is provided with an arm 22 and the arm carries an axially extending finger or lug 23 adapted to be disposed in any one of the recesses 24 formed in the nut 12. It will be observed that the recesses 24 are unequally spaced around the periphery of the nut 12. Preferably starting with the smallest space *a* the distances that the recesses are separated gradually increase up to the largest space *b*.

From the foregoing it is apparent that the nut is positively locked to the shaft. If it is desired to adjust the nut through a small angle in the direction indicated by the arrow *c*, Fig. 1, the locking element is disengaged by unscrewing the bolt 21. Then the element is again placed in position with the lug 20 in the shaft recess *d* and the lug 23 in the nut recess *e*. It will be observed that the angle through which the nut has been adjusted by this operation is indicated at *f*, this angle mounting to about 5°. It will be seen further that the angle *f* is less than the angle between the sides of one of the notches 24. In order to obtain an equally fine adjustment with the notches 24 equally spaced it would therefore be necessary to make the notches 24 so small that they would amount to practically nothing more than fine serrations and would not provide a sufficiently strong locking means. With the present invention where one of the parts is provided with equally spaced recesses and the other with unequally spaced recesses, an adjustment as fine as desired may be obtained and yet at the same time a very strong locking device is provided.

Although a specific embodiment of the invention has been described in detail it is to be understood that it is not thus limited but includes changes which come within the scope of the appended claims.

Having thus described the invention what is claimed as new and desired to be secured by Letters Patent is:

1. The combination with a cylindrical member, and a collar rotatable on the said member, of means to positively lock said collar to said member in any one of a plurality of finely spaced rotative positions including an element adapted to be locked to said member in any one of a plurality of equally spaced angular positions, and cooperating interlocking means on said element and collar spaced in gradually varying amounts around said collar.

2. The combination with a threaded member and a nut thereon, of means to lock the nut to the member in any one of a plurality of finely spaced angular positions including an element adapted to be locked to said member in any one of a plurality of equally spaced rotative positions, and interlocking means on said element and nut spaced in gradually varying amounts around said nut.

3. The combination with a threaded shaft and nut thereon, said shaft having a series of recesses in its end equally spaced circumferentially, of means to lock the nut to the shaft in any one of a plurality of finely graduated angular positions including an element having a lug adapted to fit any one of said recesses in the shaft, said nut having a series of unequally spaced recesses, and a lug on said element adapted to fit any one of said last mentioned recesses.

4. The combination with two members, one rotatable on the other, of an element adapted to be positively locked to one of said members in any one of a plurality of angularly equally spaced positions, and means on said element adapted to positively interlock with the other element in any one of a plurailty of positions spaced angularly, in gradually varying amounts.

5. The combination with a threaded shaft and nut thereon, of means to lock the nut to the shaft in any one of a plurality of finely graduated angular positions including an element having a lug adapted to fit any one of a series of recesses in the shaft spaced equally circumferentially, said nut having a series of unequally spaced recesses, said spaces increasing gradually from the smallest to the largest, and a lug on said element adapted to fit any one of said last mentioned recesses.

In testimony whereof I affix my signature.

HAROLD W. ELLIOTT.